US008589685B2

(12) United States Patent
Moon et al.

(10) Patent No.: US 8,589,685 B2
(45) Date of Patent: Nov. 19, 2013

(54) APPARATUS AND METHOD FOR DYNAMIC UPDATE OF SOFTWARE-BASED IPTV CONDITIONAL ACCESS SYSTEM

(75) Inventors: Jin-Young Moon, Daejeon (KR); Moon-Ok Choi, Cheongju (KR); Tae-In Hwang, Daejeon (KR); Eul-Hyun Paik, Daejeon (KR); Kwang-Roh Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 315 days.

(21) Appl. No.: 12/903,663

(22) Filed: Oct. 13, 2010

(65) Prior Publication Data
US 2011/0131413 A1 Jun. 2, 2011

(30) Foreign Application Priority Data
Nov. 30, 2009 (KR) .................. 10-2009-0117322

(51) Int. Cl.
*H04L 29/06* (2006.01)
(52) U.S. Cl.
USPC ............... 713/168; 725/25; 725/31; 725/110; 726/27; 370/310; 717/171
(58) Field of Classification Search
USPC ................. 725/25, 31, 110; 713/168; 726/27; 370/310; 717/171
See application file for complete search history.

(56) References Cited

U.S. PATENT DOCUMENTS

| 7,383,438 B2 | 6/2008 | Fahrny et al. |
| 2009/0144539 A1 | 6/2009 | Jeong et al. |
| 2009/0151003 A1* | 6/2009 | Moon et al. ............... 726/27 |

FOREIGN PATENT DOCUMENTS

| KR | 10-2009-0057587 | 6/2009 |
| KR | 10-2009-0060912 | 6/2009 |

* cited by examiner

*Primary Examiner* — Brandon Hoffman
*Assistant Examiner* — Hee Song
(74) *Attorney, Agent, or Firm* — Staas & Halsey LLP

(57) ABSTRACT

The apparatus for dynamic update of a software-based IPTV conditional access system includes: a server master key manager managing a master key and encrypting a conditional access code ID; a conditional access server manager generating and managing a server list, linking and storing an update policy with the conditional access server IDs included in the server list, and controlling execution of the conditional access server; and a conditional access code download server generating an ID map of set of conditional access codes by combining the plurality of conditional access codes and the plurality of conditional access code IDs that are encrypted, and transmitting the ID map of set of conditional access codes and the conditional access code to a receiver.

20 Claims, 10 Drawing Sheets

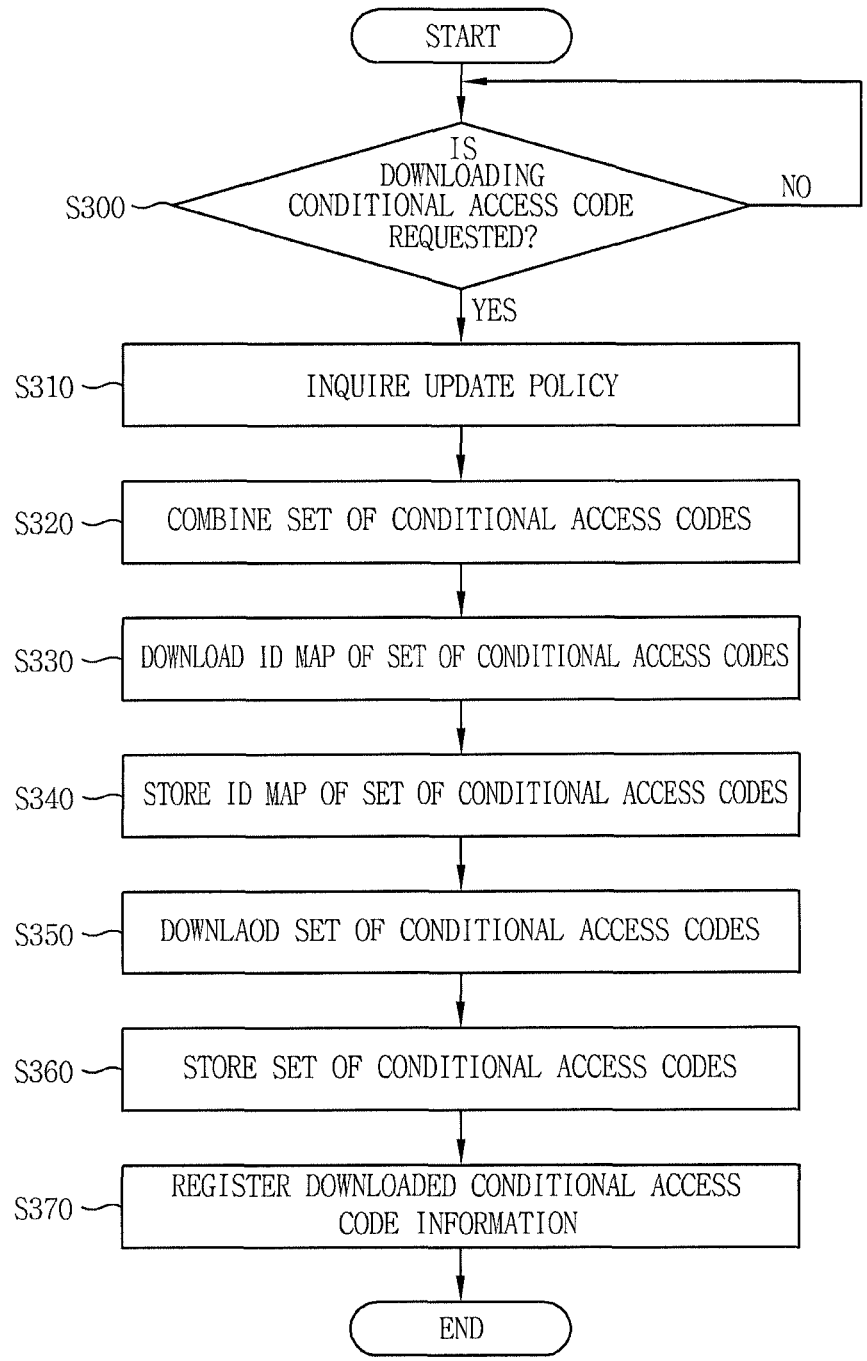

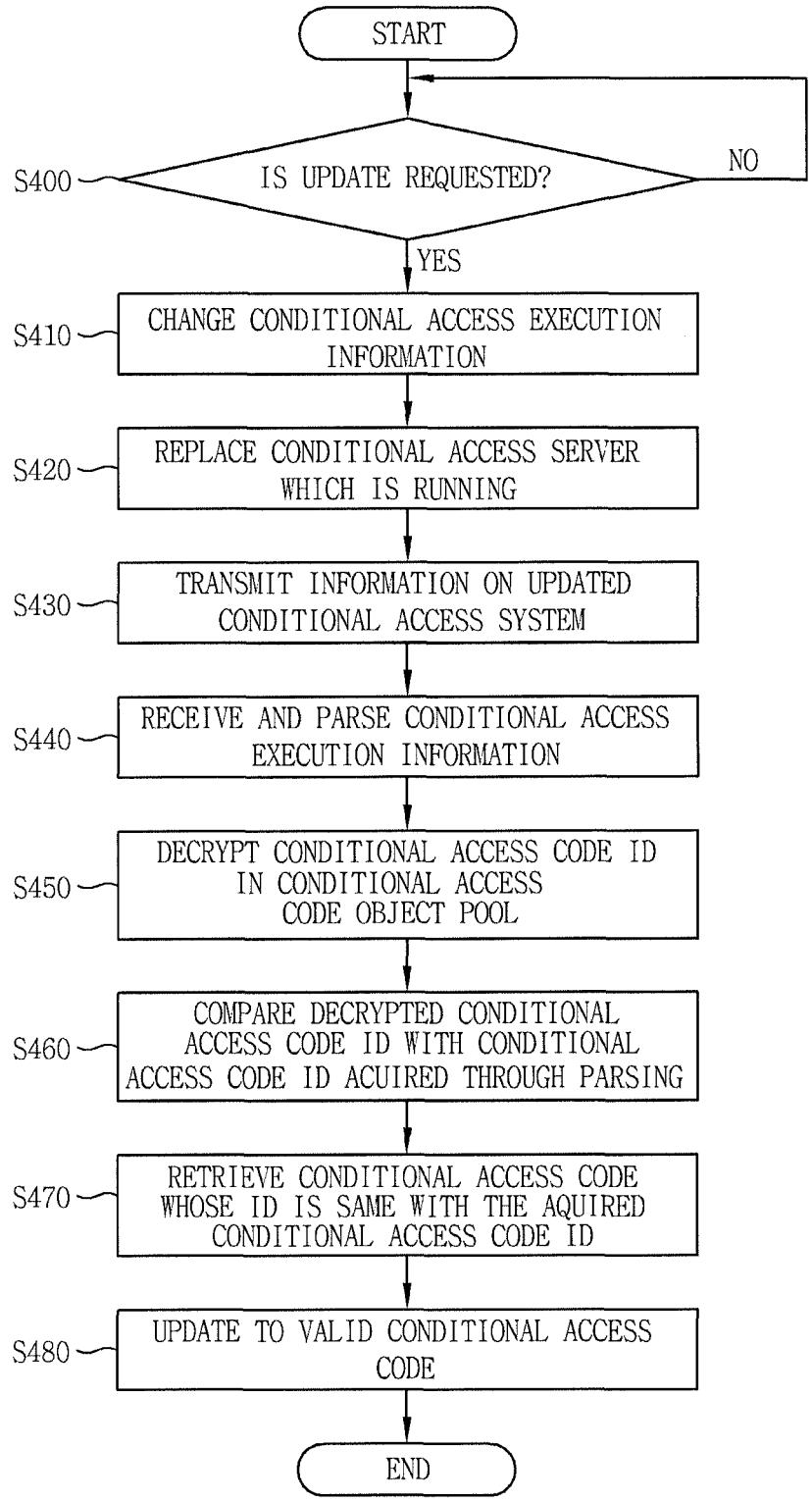

APPARATUS AND METHOD FOR DYNAMIC UPDATE OF SOFTWARE-BASED IPTV CONDITIONAL ACCESS SYSTEM

CROSS REFERENCE TO RELATED APPLICATIONS

This application claims priority to Korean Patent Application No. 10-2009-0117322 filed on Nov. 30, 2009, the entire contents of which are herein incorporated by reference.

BACKGROUND OF THE INVENTION

1. Field of the Invention

The present invention relates to an apparatus and a method for dynamic update of a software-based IPTV conditional access system, and more particularly, a method for registering a conditional access server and a conditional access code, and an update policy and downloading the conditional access codes, a method for updating the conditional access server in accordance with the update policy in the headend, a method for downloading a plurality of conditional access codes to the receiver (i.e., the settop box) through an IP network, and a method for executing a valid conditional access code in accordance with the update policy, in order to download the conditional access codes in a receiver (i.e., a settop box) and update an entire conditional access system by changing a conditional access server in a headend.

2. Description of the Related Art

In general, a conditional access system (CAS) is a contents security solution that allows only an authorized subscriber to watch a corresponding channel in a pay TV system. That is, the CAS grants an authority of watching a pay broadcast. The CAS scrambles broadcast contents and transmits the scrambled broadcast contents to a subscriber through a cable, a satellite, a terrestrial, Internet, etc., and grants an authority to descramble the scrambled broadcast contents only to a subscriber who pays a TV subscription fee to allow the subscriber to watch a 'pay service'.

FIGS. 1 to 3 are a block diagram for describing a configuration of a known conditional access system. As shown in FIGS. 1 to 3, the known conditional access system includes a headend 100 and a receiver 200.

At this time, the headend 100 transmits scrambled contents to the receiver 200 in order to prevent an unauthorized subscriber from accessing the broadcast contents. For this, the headend 100 includes a control word generator 120, a conditional access server 140, a scrambler 160, and a multiplexer (MUX) 180.

The control word generator 120 generates control words (i.e., keys used as a scrambling key and a descrambling key) used for scrambling and descrambling contents. The control word generator 120 provides the generated control words to the conditional access server 140 and the scrambler 160.

The conditional access server 140 includes an encryption module 141, an entitlement control message (ECM) generation module 146, and an entitlement management message (EMM) generation module 148. The encryption module 141 includes a first encryption module 142 encrypting the control words generated by the control word generator 120 by using an authentication key and a second encryption module 144 encrypting the authentication key used to encrypt the control words by using a subscriber key. The entitlement control message (ECM) generation module 146 generates an entitlement control message (ECM) including the control words encrypted by using the authentication key in the first encryption module 142. The authority message generation module 148 generates the entitlement management message (EMM) including the authentication key encrypted by using the subscriber key in the second encryption module 144.

The scrambler 160 scrambles the contents by using the scrambling key. That is, the scrambler 160 scrambles the contents by using the control words generated by the control word generator 120 as the scrambling key. Herein, the control words used as the scrambling key in the scrambler 160 are used as the descrambling key in the descrambler 240 of the receiver 200.

The multiplexer 180 provides the scrambled contents and the entitlement control message (ECM) and the entitlement management message (EMM) generated by the condition access server 140 to a plurality of receivers 200.

The receiver 200 receives the scrambled contents received from the headend 100. The receiver 200 descrambles the contents scrambled by using the control word (i.e., the descrambling key) received from the headend 100 to restore the contents.

In the known conditional access system as described above, the conditional access server 140 encrypts the control word with the authentication key and transmits the encrypted control word to the receiver 200 through the entitlement control message (ECM) in order to safely transmit the control word to the receiver 200. In addition, the conditional access server 140 encrypts the authentication key by using the subscriber key (i.e., a subscriber privacy key) again and thereafter, transmits the encrypted authentication key to the receiver 200 through the entitlement management message (EMM). The conditional access server 140 generates the entitlement control message (ECM) and the entitlement management message (EMM) depending on subscription and withdrawal of the subscriber. At this time, the subscriber key managed by the subscriber management system 300 is incorporated in a smart card 280 and provided to the subscriber.

When the receiver 200 receives the entitlement control message (ECM) and the entitlement management message (EMM) from the conditional access server 140 of the headend 100, the receiver 200 performs a decrypting process of the keys (i.e., the authentication key and the subscriber key) in an order reverse to the order performed by the server after passing through a message verification process. First, the receiver 200 decrypts the authentication key included in the entitlement management message (EMM) by means of the subscriber key incorporated in the smart card 280. Thereafter, the receiver 200 decrypts the control word by means of the decrypted authentication key. Next, the receiver 200 descrambles the scrambled contents by means of the decrypted control word. At this time, the receiver 200 includes a demultiplexer 220, a key management module 260 including a descrambler 246, an entitlement control message (ECM) authentication module 262 and an entitlement management message (EMM) authentication module 264, and first and second decryption modules 266 and 268, and a smart card 280.

As described above, in the case of a known hardware-based conditional access system used to provide a pay TV service, such as a cable or a satellite, the conditional access system is changeable only by replacing a removable smart card 280 or hardware installed in the receiver 200. As a result, the known hardware-based conditional access system is mounted as a replaceable hardware device such as the smart card 280 or an embedded system in the receiver 200 by including a key encrypting/decrypting part or the descrambler 246. Therefore, the known hardware-based conditional access system is difficult to replace.

In order to solve the above-mentioned problem, a software-based conditional access system using an IP network has been developed. In order to acquire the control word of the receiver 200, the software-based conditional access system converts the key management module 260 that processes an entitlement control message (ECM) and an entitlement management message (EMM) into a conditional access codes and downloads it from the headend 100, objectifies the downloaded conditional access codes through a loader, and acquires the control word by receiving current conditional access messages as an input of the objectified code. Since the software-based IPTV conditional access system uses the IP network, it can safely download the conditional access codes. As a result, a function to dynamically update the conditional access codes can improve the safety of the software-based conditional access system. That is, since an IPTV uses a bidirectional IP network, a software-based conditional access system that safely downloads the conditional access codes for processing the conditional access message and executes a valid conditional access code becomes available.

However, since the software-based conditional access system is less safe than the hardware-based conditional access system, a method for updating the conditional access system driven in the receiver 200 to a conditional access system of a type which is difficult to hack. However, since a conditional access function is directly related with channel reception, dynamic update of the conditional access system should not interrupt an authorized user's channel reception.

Therefore, the known software-based conditional access system downloads and changes the conditional access codes whenever updating the conditional access server 140 in order to safely download the conditional access codes, thereby causing breaking while watching.

Further, in the known software-based conditional access system, when the conditional access codes are set to be downloadable only in booting or downloadable only once a day in order to prevent breaking while watching, the conditional access codes should be updated at the next download time or an IPTV receiver 200 which is being watched by a user should be rebooted in the case in which a problem in safety is detected.

SUMMARY OF THE INVENTION

The present invention is contrived to solve the above-mentioned problems. There is an object of the present invention to provide an apparatus and a method for dynamic update of a software-based IPTV conditional access system that dynamically update a conditional access system without interrupting a user's watching by downloading a plurality of conditional access codes in downloading and driving a valid conditional access code among them, at the time of updating the software-based IPTV conditional access system.

There is another object of the present invention to provide an apparatus and a method for dynamic update of a software-based IPTV conditional access system that allow a system manager to establish various update policies such as periodic update, update for a predetermined period, and update at the time when hacking occurs in a headend and as a result, control driving a conditional access server generating a conditional access message.

In order to achieve the above-mentioned object, according to an embodiment of the present invention, there is provided an apparatus for dynamic update of a software-based IPTV conditional access system in a headend connected with a receiver, that includes: a server master key manager managing a master key and encrypting a conditional access code ID by using the master key; a conditional access server manager generating and managing a server list by using a plurality of conditional access servers and a plurality of conditional access server IDs that are inputted, linking and storing an inputted update policy with the conditional access server IDs included in the server list, and controlling execution of the conditional access server on the basis of the stored update policy; and a conditional access code download server requesting the server master key manager to encrypt the plurality of conditional access code IDs that are inputted, generating an ID map of set of conditional access codes by combining the plurality of conditional access codes and the plurality of conditional access code IDs that are encrypted in the server master key manager, and transmitting the ID map of set of conditional access codes and the conditional access codes to the receiver on the basis of the update policy stored in the conditional access server manager.

The conditional access code download server includes: a conditional access code registration module linking and registering the plurality of conditional access code IDs and conditional access codes, and managing conditional access codes to be downloaded to the receiver; a conditional access code download module transmitting the plurality of conditional access code IDs and conditional access codes managed by the conditional access code registration module to the receiver; and a conditional access code management module storing the conditional access code information transmitted to the receiver by the code download module, and updating previously stored conditional access code information when the conditional access codes are transmitted to the receiver by the conditional access code download module, wherein the plurality of conditional access code IDs linked with the plurality of conditional access codes stored in the conditional access code management module are synchronized with the plurality of conditional access server IDs.

The conditional access server manager includes: a conditional access server and update policy registration module registering a plurality of conditional access servers, and registering an update policy of the plurality of registered conditional access server; a conditional access system ID management module managing the plurality of conditional access server IDs registered in the conditional access server and update policy registration module; a conditional access execution information generation module providing conditional access system information which is presently executed among the plurality of conditional access servers registered in the conditional access server and update policy registration module to a PSI generator; and a conditional access server execution management module controlling execution of the conditional access server on the basis of the update policy registered in the conditional access server and update policy registration module.

The master key manager includes: a master key storing module storing a master key used to encrypt the conditional access code ID; and an encryption module encrypting the conditional access code ID by using the master key stored in the master key storing module.

The apparatus for dynamic update of a software-based IPTV conditional access system further includes a conditional access server pool storing a list and state information of the conditional access servers, and when the conditional access server is replaced in the conditional access server manger, updating the stored list and state information of the conditional access servers.

In order to achieve the above-mentioned object, according to another embodiment of the present invention, there is provided an apparatus for dynamic update of a software-based IPTV conditional access system in a receiver connected with a headend, that includes: a conditional access code object pool storing a list and state information of conditional access code objects and updating the list and state information of the conditional access code objects; a conditional access code download client downloading an ID map of set of conditional access codes and conditional access codes from the headend, and converting them into the conditional access code objects; a receiver master key manager storing a master key, and decrypting a conditional access code ID by using the master key; and a conditional access code manager updating the list and state information of the conditional access code objects by transmitting the conditional access code received from the conditional access code download client to the conditional access code object pool, and searching a valid conditional access code from the conditional access code object pool on the basis of the conditional access code ID obtained from conditional access execution information received from the headend, and requesting the master key manager to decrypt each conditional access code ID stored in the conditional access code object pool in order to compare the conditional access code IDs while searching, and updating a conditional access code object which is running to a valid conditional access code object corresponding to the obtained conditional access code ID.

The conditional access code download client includes: a conditional access code download module downloading the ID map of set of conditional access codes and the conditional access codes from the headend; and a conditional access code loading module objectifying the conditional access codes downloaded by the conditional access code download module.

The conditional access code manager includes: an ID map of set of conditional access codes management module storing and updating the ID map of set of conditional access codes received from the conditional access code download client; a conditional access execution information analysis module obtaining a conditional access code ID from the conditional access execution information received from the headend, and obtaining a valid conditional access code from the conditional access code ID stored in the ID map of set of conditional access codes management module on the basis of the obtained conditional access code ID; and a conditional access code execution management module updating the conditional access code object which is running to the valid conditional access code object corresponding to the conditional access code ID obtained by the conditional access execution information analysis module.

The receiver master key manager decrypts the conditional access code ID of the conditional access code object by using the master key, and transmits the decrypted conditional access code ID to the conditional access code manager.

the receiver master key manager includes: a master key storing module storing the master key; and a decryption module decrypting the conditional access code ID by using the master key stored in the master key storing module.

In order to achieve the above-mentioned object, according to yet another embodiment of the present invention, there is provided a method for dynamic update of a software-based IPTV conditional access system that includes: downloading a plurality of (conditional access codes from a conditional access code and server update device installed in a headend by a conditional access update device installed in a receiver); and updating a conditional access code which is running using a detected conditional access code which is linked with an updated conditional access server ID which is obtained from a PSI received from the headend.

The downloading a plurality of conditional access codes includes: downloading an ID map of set of conditional access codes in accordance with a conditional access system update policy from the conditional access code and server update device by the conditional access update device; and downloading the plurality of conditional access codes linked with conditional access code IDs is included at the downloaded ID map of set of conditional access codes from the conditional access code and server update device by the conditional access update device.

The updating a detected conditional access code includes: receiving a PSI including information on the replaced conditional access server from the headend by the conditional access update device, when a conditional access server is replaced on the basis of an update policy of the conditional code system in the conditional access code and server update device; obtaining a conditional access server ID of the replaced conditional access server by parsing the PSI generated at the PSI generator receiving by the conditional access update device in the receiver; searching a conditional access code object corresponding to an obtained conditional access code ID linked with the conditional access server ID searching among the plurality of conditional access code objects downloaded at the downloading a plurality of conditional access codes by the conditional access update device; and updating the conditional access code object which is running by the conditional access update device to the conditional access code object searched at the conditional access code detecting.

The updating a detected conditional access code further includes: decrypting the obtained conditional access code ID detected at the conditional access code detecting by a receiver master key manager.

The method for dynamic update of a software-based IPTV conditional access system further includes encrypting and registering a plurality of conditional access codes inputted from a system manager by the conditional access code update management device.

The encrypting of conditional access code IDs and registering a plurality of conditional access codes includes: receiving the number of codes which are required to be registered from the system manager by the conditional access code and server update device; receiving a plurality of conditional access code files and conditional access code IDs corresponding to the number of the conditional access codes which are requested to be registered, which is inputted at the conditional access code number inputting by the conditional access code and server update device; encrypting the conditional access code ID inputted at the receiving a plurality of conditional access code files and conditional access code IDs by the conditional access code and server update device; and storing the conditional access code ID encrypted at the encrypting the conditional access code ID in linked with the conditional access code file inputted at the receiving a plurality of conditional access code files and conditional access code IDs by the conditional access code and server update device.

The method for dynamic update of a software-based IPTV conditional access system further includes registering conditional access servers linked with the conditional access codes, respectively by the conditional access code and server update device.

The registering conditional access servers includes: receiving the number of conditional access servers which are requested to be registered from the system manager by the conditional access code and server update device; registering a plurality of conditional access servers corresponding to the number of the conditional access servers which are requested to be registered, which is received at the receiving the number of conditional access servers by the conditional access code and server update device; and adding the plurality of conditional access servers which are registered at the registering a plurality of conditional access servers to a server list by the conditional access code and server update device, wherein at the registering a plurality of conditional access servers, conditional access server IDs of the registered conditional access servers are registered in linked with the plurality of conditional access codes by the conditional access code and server update device.

At the registering conditional access servers, the plurality of conditional access servers linked with the plurality of conditional access codes, respectively are stored in the conditional access server pool.

The method for dynamic update of a software-based IPTV conditional access system further includes registering an update policy for the plurality of conditional access servers registered at the registering conditional access servers by the conditional access code and server update device.

According to an embodiment of the present invention, it is possible to reinforce the security of a software-based conditional access system by providing a method for dynamic update of a software-based IPTV conditional access system.

Further, it is possible to update a conditional access system without interrupting a viewer's channel reception by downloading a plurality of conditional access codes for dynamic update of the conditional access system.

Besides, it is possible to prevent even a risk of leakage of the conditional access code that is driven by encrypting and managing a code ID of each conditional access code downloaded at the time of dynamic update of the conditional access system.

BRIEF DESCRIPTION OF THE DRAWINGS

FIG. 9 is a flowchart for describing a method for downloading a conditional access code according to an exemplary embodiment of the present invention; and FIG. 10 is a flowchart for describing a method for updating a conditional access system according to an exemplary embodiment of the present invention.

DETAILED DESCRIPTION OF THE PREFERRED EMBODIMENTS

Figure 1:
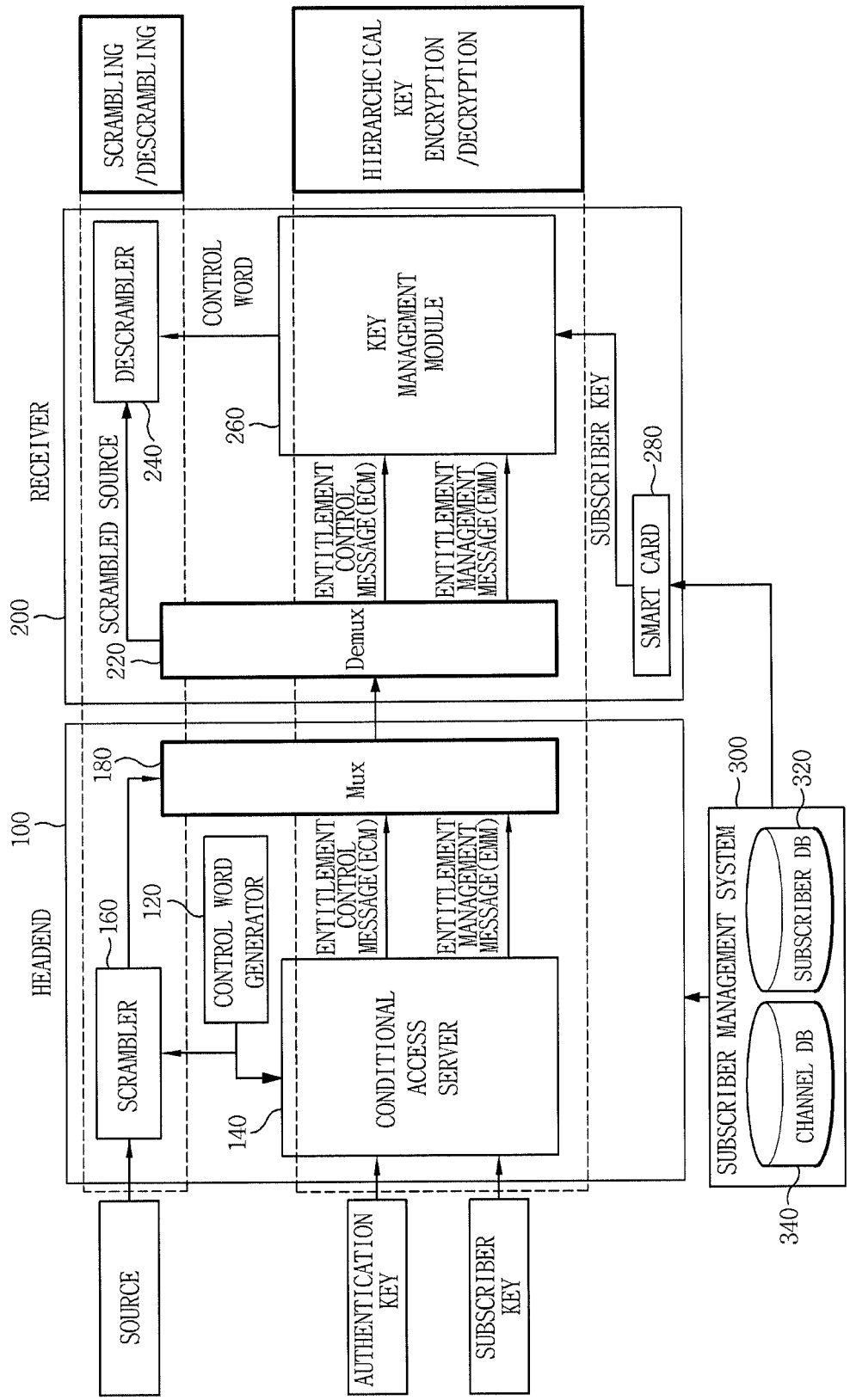
FIGS. 1 to 3 are a block diagram for describing a configuration of a known conditional access system.
Figure 2:
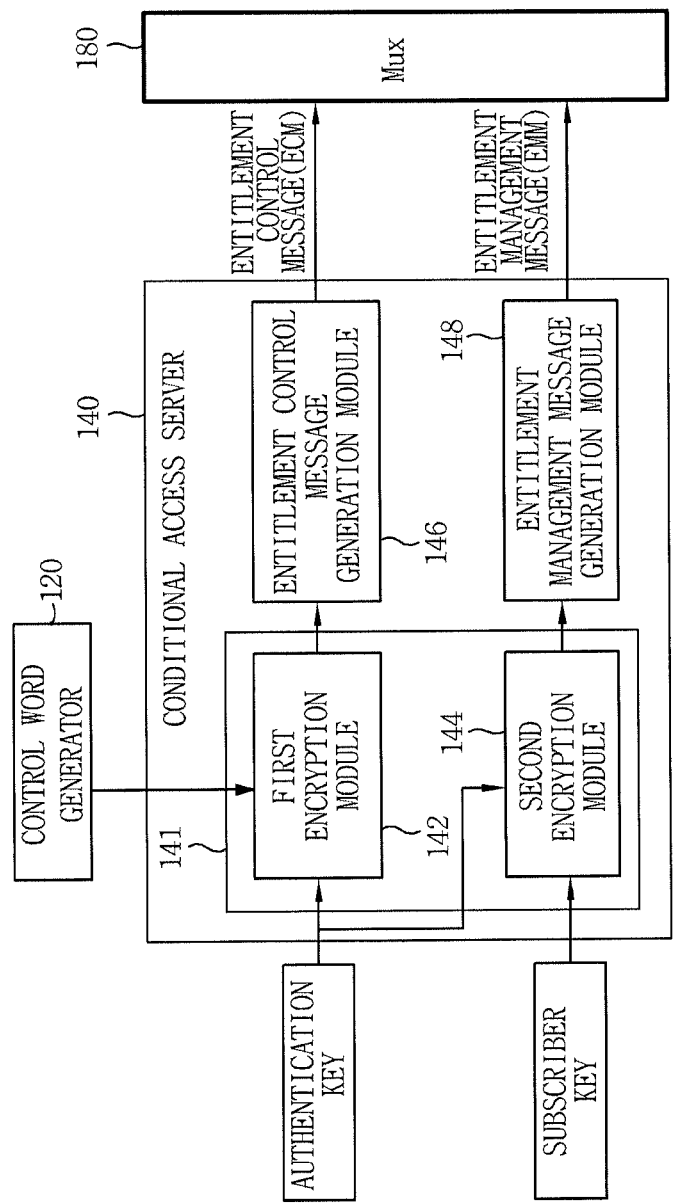
Figure 3:
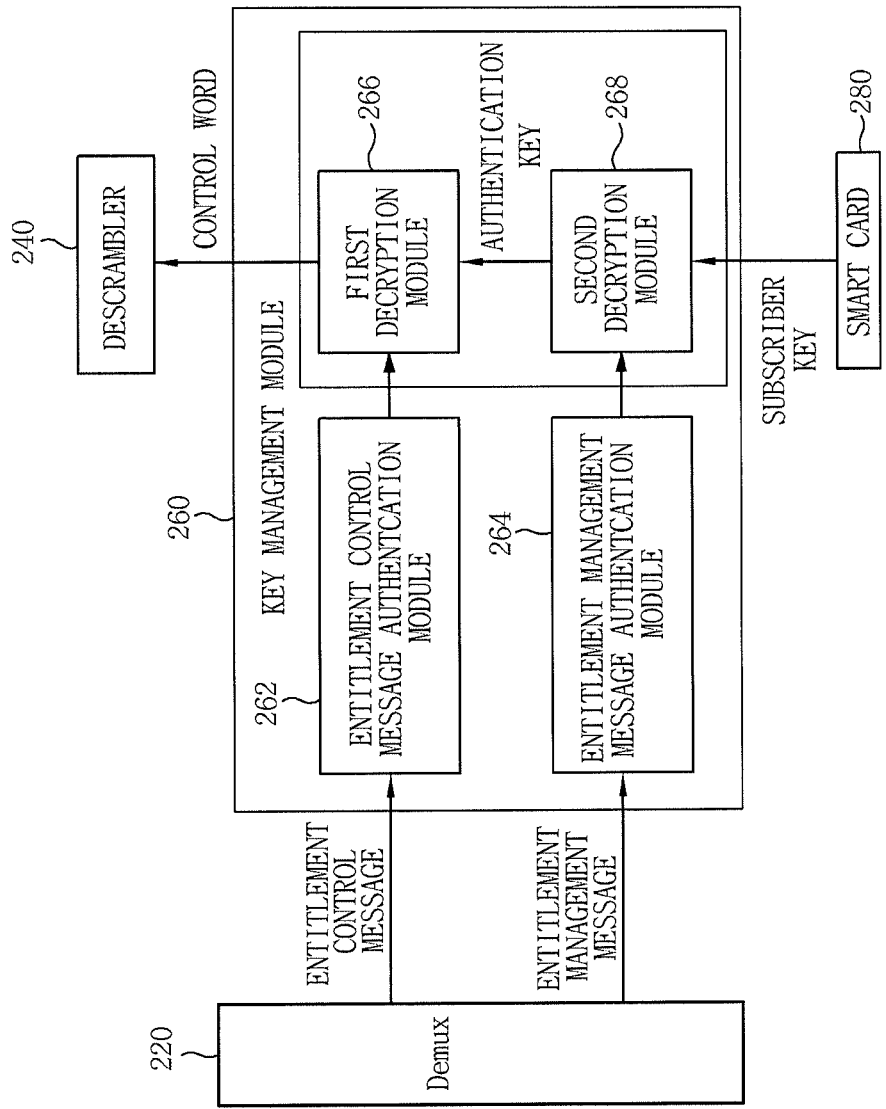

Hereinafter, the exemplary embodiments of the present invention will be described in detail with reference to the accompanying drawings. The exemplary embodiments of the present invention to be described below are provided so that those skilled in the art to which the present invention pertains can fully carry out the present invention. Therefore, the present invention may be modified in many different forms and it should not be limited to the embodiments set forth herein. First of all, we should note that in giving reference numerals to elements of each drawing, like reference numerals refer to like elements even though like elements are shown in different drawings. Further, in describing the present invention, well-known functions or constructions will not be described in detail since they may unnecessarily obscure the understanding of the present invention.

Hereinafter, a dynamic update device of a software-based IPTV conditional access system according to an exemplary embodiment of the present invention will be described in detail with reference to the accompanying drawings.

Figure 4:
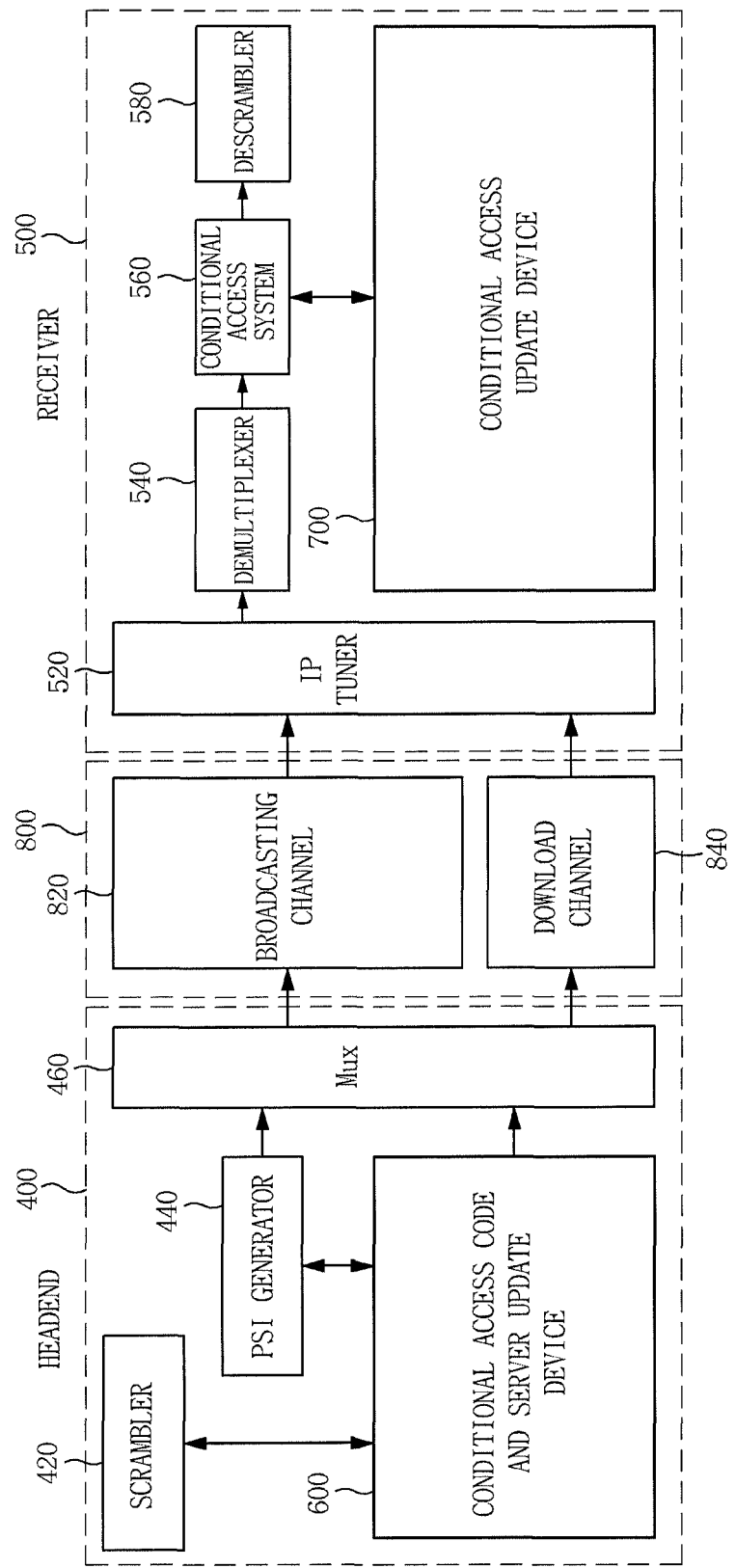
FIG. 4 is a block diagram for describing a software-based IPTV conditional access system according to an exemplary embodiment of the present invention.

FIG. 4 is a block diagram for describing a software-based IPTV conditional access system according to an exemplary embodiment of the present invention.

As shown in FIG. 4, the software-based IPTV conditional access system according to the exemplary embodiment of the present invention includes a headend 400 and a receiver 500 connected through an IP network 800. Herein, the IP network 800 may be constituted by a broadcasting channel 820 and a download channel 840 logically dividing a payload transmitted through an IP packet.

The headend 400 includes a scrambler 420 scrambling broadcast contents by using a conditional access code, a PSI generator 440 generating program specific information (PSI) including a program map table (PMT) containing information on a presently executed conditional access system 560, a program association table (PAT), and a conditional access table (CAT), a conditional access code and server update device 600 updating the conditional access code in link with a conditional access update device 700 of the receiver 500, and a multiplexer 460 transmitting the broadcast contents and a conditional access related message to the receiver 500. Herein, the PSI is program specification information. That is, the PSI, which relates to a program control table transmitted using an MPEG 2 transport stream, is established in an MPEG system standard. For example, examples of the PSI include a network information table (NIT) describing the entire network including other transponder, a program association table (PAT) which is control information of all programs transmitted in the transponder, etc.

The receiver 500 includes an IP tuner 520 receiving the broadcast contents, the conditional access related message, and the conditional access code through a broadcasting channel 820 and a download channel 840 of an IP network 800, a demultiplexer (DEMUX) 540 demultiplexing the broadcast contents, the conditional access related message, and the conditional access code received from the IP tuner 520, the conditional access system 560 performing a processing operation to allow only a user (i.e., the receiver 500) who has a reception authority to watch (listen to) the corresponding broadcast contents by using the conditional access code, the conditional access update device 700 updating the conditional access code in link with the conditional access code and server update device 600 of the headend 400, and a descrambler 580 descrambling the broadcast contents received from the headend 400 by using the conditional access code.

Figure 5:
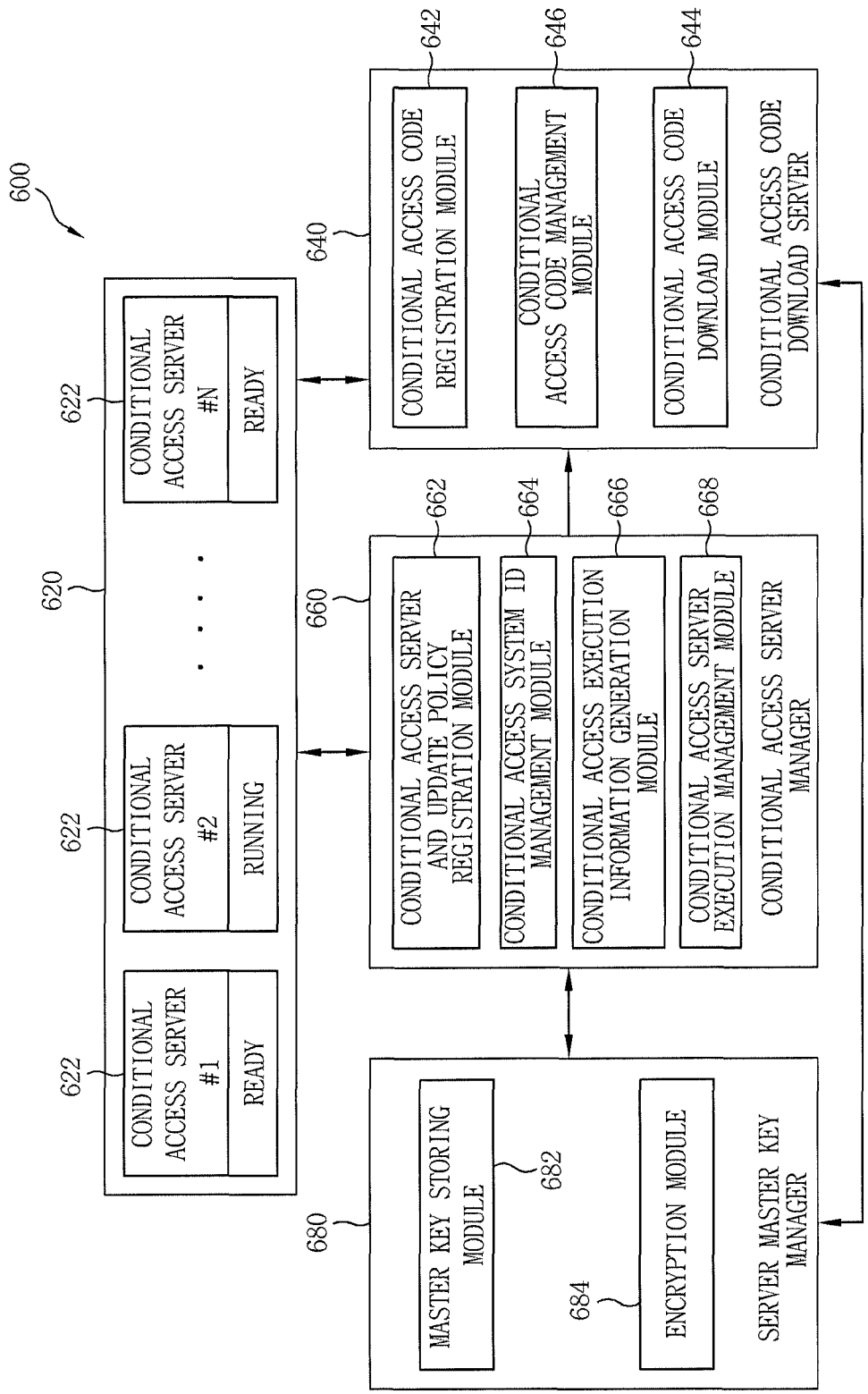
FIG. 5 is a block diagram for describing a conditional access code and server update device of FIG. 4.

FIG. 5 is a block diagram for describing a conditional access code and server update device installed in a headend of FIG. 4.

As shown in FIG. 5, the conditional access code and server update device 600 installed in the headend 400 includes a conditional access server pool 620, a conditional access code download server 640, a conditional access server manager 660, and a server master key manager 680.

The conditional access server pool 620 manages an available conditional access server 622. That is, the conditional access server pool 620 stores a list the available conditional access server 622 and a state of each conditional access server 622 (i.e., a READY state or a RUNNING state). The conditional access server pool 620 updates the state of the corresponding conditional access server 622 as the state of the conditional access server 622 is changed.

The conditional code download server 640 receives a conditional access code file in addition to a conditional access code ID. That is, the conditional access code download server 640 provides an UI or a command line for inputting the conditional access code ID and the conditional access code file while a request for registering the conditional access server 622 is made as well as inputting the number of conditional access codes which is requested to be registered from a system manager, to the corresponding system manager. Herein, the conditional access code download server 640 provides a function of file uploading on the UI or command line and receives the conditional access code ID and the conditional access code by uploading the conditional access code ID and the conditional access code file of the system manager.

The conditional access code download server 640 requests the server master key manager 680 to encrypt the inputted conditional access code ID. The conditional access code download server 640 receives the encrypted conditional access code ID from the server master key manager 680 and transmits it to the conditional access server manager 660. The conditional access code download server 640 receives the encrypted conditional access code ID from the server master key manager 680 and stores it in addition to the corresponding conditional access code.

The conditional access code download server 640 repetitively performs uploading of the conditional access code file, encryption of the conditional access code ID, and storing of the encrypted conditional access code ID until the number of conditional access codes inputted from the system manager is equal to the number of previously registered codes. That is, the conditional access code download server 640 repetitively performs storing the conditional access code IDs encrypted as many as the number of codes which is requested to be registered, which is inputted from the system manager.

The conditional access code download server 640 manages the previously stored conditional access codes. That is, the conditional access code download server 640 manages the conditional access codes inputted from the system manager as a set and manages the conditional access codes divided into a conditional access code to be downloaded to a conditional access code download client 740 and a conditional access code downloaded to the receiver 500.

The conditional access code download server 640 inquires an update policy of the conditional access system 560, which is stored in the conditional access server manager 660 at the time of receiving a request for downloading the conditional access code from the conditional access code download client 740. The conditional access code download server 640 receives the update policy of the corresponding conditional access server 622 from the conditional access server manager 660 and combines the resulting sets of the conditional access codes to generate an ID map of the conditional access codes. At this time, the ID map is constituted by a list of IDs acquired by encrypting IDs of actual conditional access codes. The conditional access code download server 640 transmits the ID map of the generated conditional access codes to the conditional access code download client 740 and thereafter, downloads a plurality of conditional access codes corresponding to the ID map.

In order to perform the above-mentioned function, the conditional access code download server 640 includes a conditional access code registration module 642, a conditional access code download module 646, and a conditional access code management module 644. Herein, the conditional access code registration module 642 registers conditional access codes to be updated and manages a set of the conditional access codes to be downloaded to the receiver 500. The conditional access code download module 646 safely downloads the conditional access codes to the receiver 500. The conditional access code management module 644 manages states of the conditional access codes downloaded to the receiver 500. An ID of an objectified conditional access code which is running in the receiver 200 should be synchronized with a system ID of the conditional access server 622.

The conditional access server manager 660 receives the conditional access server 622 in addition to the conditional access code ID while the request for registering the conditional access server 622 is made as well as inputting the number of the conditional access servers which are requested to be registered from the system manager. That is, the conditional access server manager 660 provides a UI or a command line for inputting the system ID of the conditional access server 622 and the conditional access server 622 to the system manager at the time of receiving the request for registering the conditional access server 622 from the system manager. Herein, the conditional access server manager 660 provides the file uploading function on the UI or the command line to receive the system ID of the conditional access server 622 and a file of the conditional access server 622 from the system manager. The conditional access server manager 660 adds the inputted file of the conditional access server 622 to the server list and stores the inputted system ID of the conditional access server 622.

The conditional access server manager 660 repetitively performs uploading and storing of the system ID of the conditional access server 622 and the file of the conditional access server 622 and updating the server list until the number of the conditional access servers which is requested to be registered, which is inputted from the system manager is equal to the number of previously registered conditional access servers.

The conditional access server manager 660 stores the encrypted conditional access code ID in accordance with a request from the conditional access code download server 640. That is, the conditional access server manager 660 stores the conditional access code ID received from the conditional access code download server 640. At this time, the conditional access server manager 660 receives the conditional access code ID encrypted by the server master key manager 680 from the conditional access code download server 640. Herein, the conditional access server manager 660 stores the encrypted conditional access code ID in the ID map of set of conditional access codes.

The conditional access server manager 660 registers an update policy of the conditional access system 560 by linking the registered conditional access server 622 and the system ID of the registered conditional access server 622 with each other. For example, the conditional access server manager 660 registers both the conditional access server 622 and the conditional access code for each of three conditional access servers 622 having system IDs of AA-3-1, AA-3-2, and AA-3-3 and thereafter, establishes the update policy so as to sequentially update the conditional access servers for 8 hours per day for one month.

The conditional access server manager 660 generates an update event of the conditional access system 560 in accordance with the registered update policy of the conditional access system 560. The conditional access server manager 660 transmits changes of conditional access execution information such as a changed conditional access system ID, etc., to the PSI generator 440 to requests for changing the conditional access execution information.

The conditional access server manager 660 replaces the conditional access server 622 with a conditional access server 622 to be updated. At this time, when the conditional access server 622 is replaced, the updated conditional access server 622 generates the conditional access related message and the conditional access related information is transmitted to the receiver 500 through the PSI generated by the PSI generator 440, in the headend 400.

In order to perform the above-mentioned function, the conditional access server manager 660 includes a conditional access server and update policy registration module 622, a conditional access system ID management module 664 of the conditional access server 622, a conditional access execution information generation module 666, and an execution control module 668 of the conditional access server 622. Herein, the conditional access server and update policy registration module 62 registers the conditional access server 622 and registers a policy for updating the servers. The conditional access system ID management module 664 of the conditional access server 622 manages the ID of the conditional access system 560. The conditional access execution information generation module 666 provides information on the conditional access system 560 which is being presently executed to the PSI generator 440. The execution control module 668 of the conditional access server 622 performs a control to manually start and stop execution of the conditional access server 622.

The server master key manager 680 manages a master key for use in downloading the conditional access code and encrypting a code identifier. For this, the server master key manager 680 encrypts the conditional access code ID inputted from the system manager. That is, the server master key manager 680 encrypts the conditional access code ID inputted from the system manager by using the stored master key.

In order to perform the above-mentioned function, the server master key manager 680 includes a master key storing module 682 storing the master key and an encryption module 684 encrypting the conditional access code ID.

Figure 6:
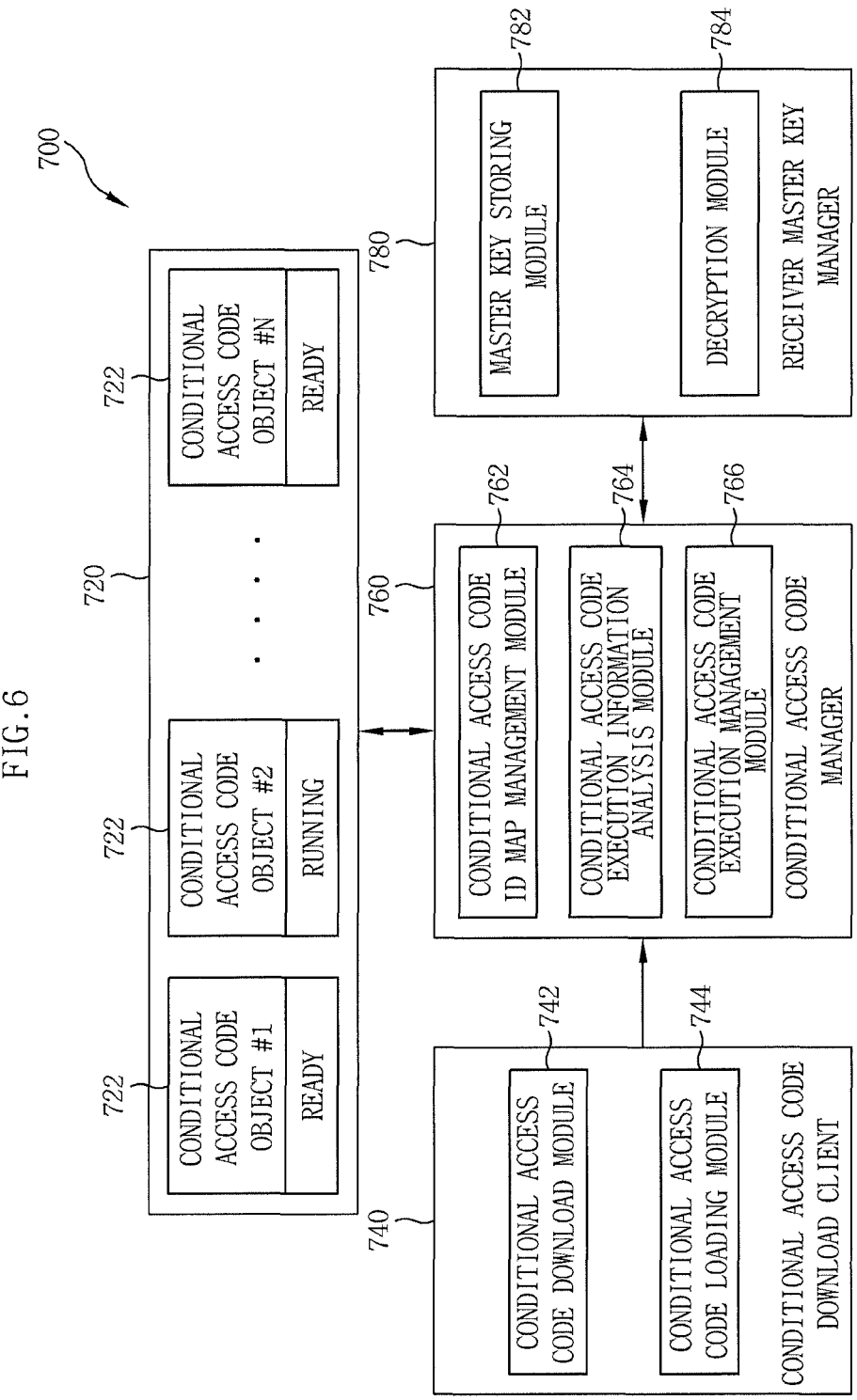
FIG. 6 is a block diagram for describing a conditional access update device of FIG. 4.

FIG. 6 is a block diagram for describing a conditional access update device installed in a receiver of FIG. 4.

As shown in FIG. 6, the conditional access update device 700 installed in the receiver 500 includes a conditional access code object pool 720, a conditional access code download client 740, a conditional access code manager 760, and a receiver master key manager 780.

The conditional access code object pool 720 manages a valid conditional access code object 722. That is, the conditional access code object pool 720 stores a list of the valid conditional access code objects 722 and a state of each conditional access code object 722 (i.e., the READY state or the RUNNING state). The conditional access code object pool 720 updates the state of the corresponding conditional code object 722 as the state of the conditional code object 722 is changed.

The conditional access code download client 740 safely downloads the set of the conditional access codes from the conditional access download server and objectifies the set. That is, the conditional access code download client 740 requests the conditional access code download server 640 to download the conditional access code to download the ID map of the conditional access codes and a plurality of conditional access codes. The conditional access code download client 740 objectifies the downloaded conditional access codes to the conditional access code object 722.

The conditional access code download client 740 transmits the conditional access code object 722 and the ID map of set of conditional access codes to the conditional access code manger 760.

In order to perform the above-mentioned function, the conditional access code download client 740 includes a conditional access code download module 742 downloading the conditional access code from the conditional access code download server 640 and a conditional access code loading module 744 objectifying the downloaded conditional access code and transmitting the ID map of set of conditional access codes and the conditional access code object 722 to the conditional access code manager 760.

The conditional access code manager 760 manages the ID map of the conditional access code and the conditional access code object 722 received from the conditional access code download client 740. That is, the conditional access code manager 760 stores the ID map of the conditional access code received from the conditional access code download client 740 and registers the conditional access code object 722 in the conditional access code object pool 720. Herein, the conditional access code manager 760 receives the conditional access execution information (i.e., the state information of the conditional access server 622) updated by the PSI generator 440 to change state information of the conditional access code object 722 registered in the conditional access code object pool 720. The conditional access code manager 760 acquires the conditional access code ID by parsing the received conditional access execution information. The conditional access code manager 760 stores information on the conditional access code downloaded from the conditional access code download server 640 to the receiver 500 when storing the conditional access codes are completed.

The conditional access code manager 760 requests the receiver master key manager 780 to decrypt the conditional access code ID. The conditional access code manager 760 receives the decrypted conditional access code ID from the receiver master key manager 780. The conditional access code manager 760 searches the valid conditional access code object 722 from the conditional access code object pool 720 by using the decrypted conditional access code ID.

The conditional access code manager 760 analyzes the conditional access execution information to be executed analyzing the PSI to execute the valid conditional access code. The conditional access code manager 760 replaces the conditional access code which is running using the searched valid conditional access code object 722 with the detected conditional access code.

In order to perform the above-mentioned function, the conditional access code manager 760 includes an ID map of set of conditional access codes module 762 storing and updating the ID map of set of conditional access codes, a conditional access execution information analysis module 764 obtaining the valid conditional access code by analyzing the PSI, and a conditional access code execution management module 766 executing and replacing the conditional access code. In the conditional access code execution management module 766, when the conditional access codes are first objectified and enters the conditional access code object pool 720 and when a presently required code is changed and executed, and thereafter is stopped, the corresponding conditional access code object becomes the "READY" state and only one conditional access code object 722 which is running becomes the "RUNNING" state.

The receiver master key manager 780 stores a master key for use in safely downloading the conditional access code and acquiring an ID of the available conditional access and decrypts the conditional access code ID. That is, the receiver master key manager 780 decrypts the conditional access code ID received from the conditional access code download server 640 by using the stored master key in accordance with a request from the conditional access code manager 760.

In order to perform the above-mentioned function, the receiver master key manager 780 includes a master key storing module 782 storing the master key and a decryption module 784 decrypting the conditional access code ID.

Hereinafter, a dynamic update method of a software-based IPTV conditional access system according to an exemplary embodiment of the present invention will be described in detail with reference to the accompanying drawings.

Figure 7:
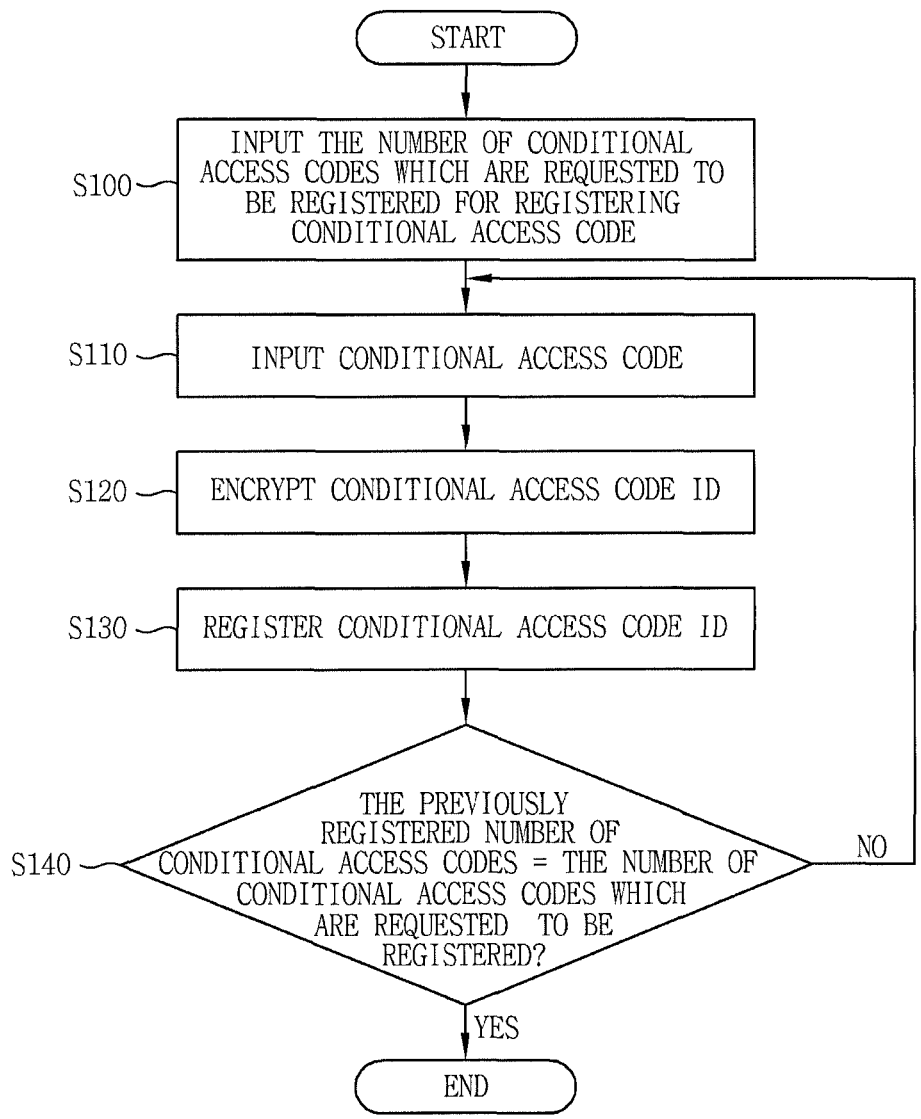
FIG. 7 is a flowchart for describing a method for registering a conditional access code according to an exemplary embodiment of the present invention.

FIG. 7 is a flowchart for describing a method for registering a conditional access code according to an exemplary embodiment of the present invention.

A system manager inputs the number of conditional access codes which are requested to be registered corresponding to the number of conditional access codes to be registered in order to register the conditional access code (S100).

When the number of the conditional access codes which are requested to be registered is received from the system manager, a conditional access code download server 640 receives the conditional access code from the system manager (S110). At this time, the conditional access code download server 640 provides an UI or a command line for inputting a conditional access code ID and a conditional access code file to the corresponding system manager. Herein, the conditional access code download server 640 provides a function of file uploading on the UI or command line and receives the conditional access code ID and the conditional access code by updating the conditional access code ID and the conditional access code file of the system manager.

The conditional access code download server 640 requests a server master key manager 680 to encrypt the inputted conditional access code ID (S120). As a result, the master key manager encrypts the conditional access code ID by using a master key stored in a master key storing module 682 and transmits it to the conditional access code download server 640.

The conditional access code download server 640 registers the encrypted conditional access code ID in a conditional access server manager 660 (S130). As a result, the conditional access server manager 660 stores the conditional access code ID received from the conditional access code download server 640. Herein, the conditional access server manager 660 stores the encrypted conditional access code ID in an ID map of set of conditional access codes.

The conditional access code download server 640 determines whether or not registration of the conditional access codes are completed based on the number of previously registered conditional access codes and the number of the conditional access codes which are requested to be registered, which is inputted from the system manager. At this time, when the number of the previously registered conditional access codes is less than the number of the conditional access codes which are requested to be registered (S140; YES), the conditional access code download server 640 repetitively performs steps S110 to S130. That is, the conditional access code download server 640 terminates registration of the conditional access code when the number of the previously registered conditional access codes is equal to the number of the conditional access codes which are requested to be registered.

Figure 8:
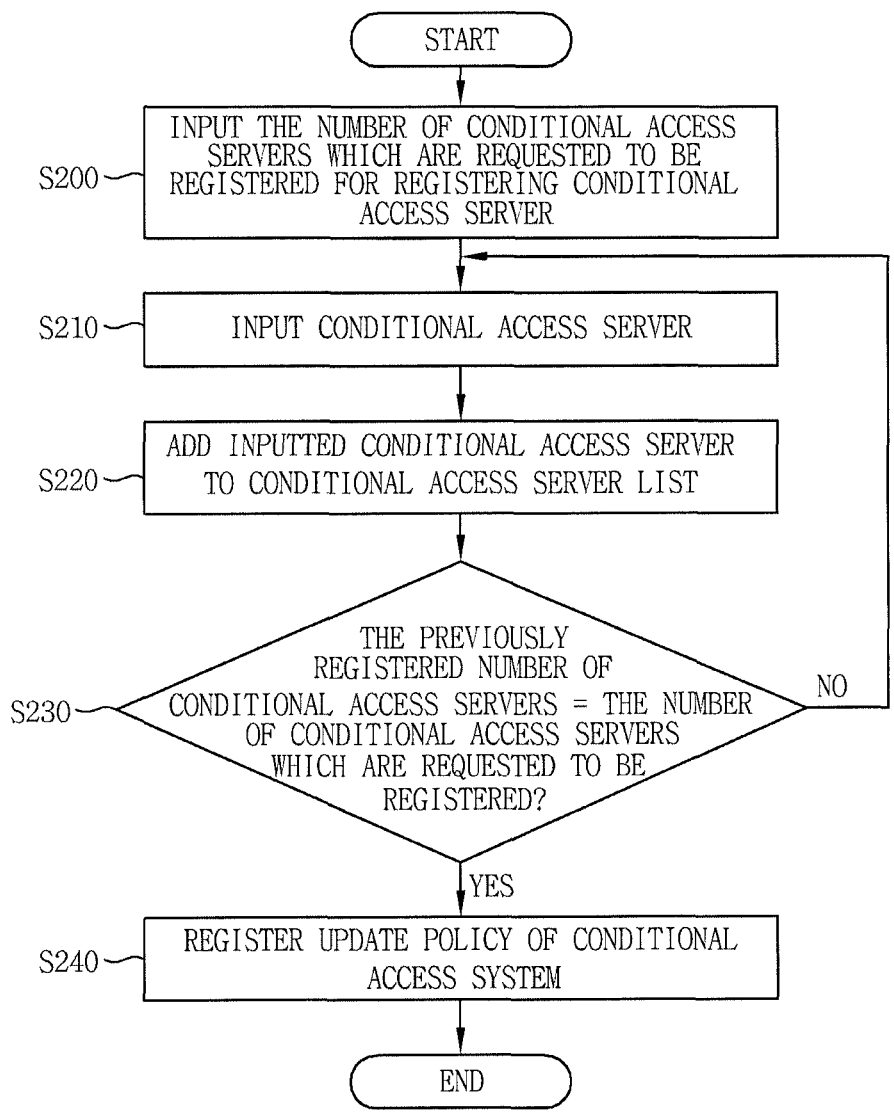
FIG. 8 is a flowchart for describing a method for establishing a conditional access system and an update policy according to an exemplary embodiment of the present invention.

FIG. 8 is a flowchart for describing a method for establishing a conditional access system and an update policy according to an exemplary embodiment of the present invention.

The system manager inputs the number of conditional access servers which are requested to be registered corresponding to the number of conditional access servers to be registered in order to register the conditional access server (S200).

When the number of the conditional access servers which are requested to be registered is received from the system manager, a conditional access server manager 660 receives a conditional access server 622 from the system manager (S210). At this time, the conditional access server manager 660 receives the conditional access server 622 in addition to the conditional access code ID. That is, the conditional access server manager 660 provides an UI or a command line for inputting a conditional access system ID of the conditional access server 622 and the conditional access server 622 to the corresponding system manager. Herein, the conditional access server manager 660 provides the file uploading function on the UI or the command line to receive the conditional access system ID of the conditional access server 622 and a file of the conditional access server 622 from the system manager.

The conditional access server manager 660 adds the conditional access server 622 inputted from the system manager to a list of the conditional access servers 622 (S220). At this time, the conditional access server manager 660 links and stores the inputted system ID of the conditional access server 622 as well as adding the inputted file of the conditional access server 622 to the server list.

The conditional access code manager 660 determines whether or not registration of the conditional access server 622 is completed based on the number of previously registered conditional access servers and the number of the conditional access servers which are requested to be registered, which is inputted from the system manager. At this time, when the number of the previously registered conditional access servers is less than the number of the conditional access servers which are requested to be registered (S230; YES), the conditional access server manager 660 registers the conditional access servers 622 having the same number as the number of the conditional access servers which are requested to be registered, which is requested from the system manager by repetitively performing steps S210 to S220. That is, the conditional access server manager 660 terminates registration of the conditional access server when the number of the previously registered conditional access servers is equal to the number of the conditional access servers which are requested to be registered.

The conditional access server manager 660 receives an update policy of a conditional access system 560 from the system manager when the number of the previously registered conditional access servers is equal to the number of the conditional access servers which are requested to be registered (S240). The conditional access server manager 660 receives an update policy applied for each registered conditional access server 622 from the system manager. Of course, the conditional access server manager 660 may receive an update policy commonly applied to all the registered conditional access servers 622 from the system manager. At this time, the conditional access server manager 660 registers the update policy of the conditional access system 560 by linking the registered conditional access server 622 and the conditional access system ID of the registered conditional access server 622 with each other. For example, the conditional access server manager 660 registers both the corresponding conditional access server 622 and the conditional access code for each of three conditional access servers 622 having system IDs of AA-3-1, AA-3-2, and AA-3-3 and thereafter, establishes the update policy so as to sequentially update the conditional access servers for 8 hours per day for one month.

FIG. 9 is a flowchart for describing a method for downloading a conditional access code according to an exemplary embodiment of the present invention.

A conditional access code download client 740 requests the conditional access code download server 640 to download the conditional access code in order to update the conditional access code.

When downloading the conditional access codes are requested from the conditional access code download client 740 (S300; YES), the conditional access code download server 640 inquires the update policy of the conditional access system 560 registered in the conditional access server manager 660 (S310).

The conditional access code download server 640 combines a set of the registered conditional access codes when inquiring the update policy of the conditional access system 560 is completed (S320). The conditional access code download server 640 transmits the conditional access code combined with the ID map of the conditional access code to the conditional access code download client 740.

The conditional access code download client 740 downloads the ID map of the conditional access code from the conditional access code download server 640 (S330). The conditional access code download client 740 transmits the downloaded ID map of the conditional access code to the conditional access code manager 760. The conditional access code manager 760 stores the ID map of the conditional access code received from the conditional access code download client 740 (S340).

Next, the conditional access code download client 740 downloads the conditional access code from the conditional access code download server 640 (S350).

The conditional access code download client 740 stores the received conditional access code (S360). When storing the conditional access codes are normally completed, the conditional access code download client 740 notifies storing completion of the conditional access code to the conditional access code download server 640.

The conditional access code download server 640 stores information on the conditional access code downloaded to a receiver 500 (S370).

FIG. 10 is a flowchart for describing a method for updating a conditional access system according to an exemplary embodiment of the present invention.

When the conditional access server manager 660 requests updating in accordance with the update policy of the conditional access system 560 (S400; YES), the conditional access server manager 660 requests a PSI generator 440 to change conditional access execution information (S410). That is, the server manager notifies changes of the conditional access execution information including a changed conditional access server ID to the PSI generator 440.

In addition, the conditional access server manager 660 replaces the conditional access server 622 which is running with a conditional access server 622 to be updated in accordance with the corresponding update policy (S420).

When replacement of the conditional access server 622 is completed, the PSI generator 440 transmits the information on the updated conditional access system 560 to the conditional access code manager 760 (S430).

The conditional access code manager 760 parses the conditional access execution information received from the PSI generator 440 (S440). At this time, the conditional access code manager 760 acquires the conditional access code ID from the conditional access execution information through parsing. The conditional access code manager 760 requests a receiver master key manager 780 to decrypt the conditional access code ID encrypted and stored in order to compare a previously downloaded conditional access code ID with the acquired conditional access code ID.

As a result, the receiver master key manager 780 decrypts a conditional access code ID stored in a conditional access code object pool (S450). At this time, the receiver master key manager 780 decrypts the conditional access code ID stored by using a previously stored master key and transmits it to the conditional access code manager 760.

The conditional access code manager 760 compares the decrypted conditional access code ID with the conditional access code ID acquired through parsing (S460).

The conditional access code manager 760 decrypts the stored conditional access code ID by repetitively performing conditional access steps S450 to S460 and retrieves the conditional access code whose ID is same by comparing the conditional access code ID acquired through PSI parsing with the decrypted conditional access code ID (S470).

The conditional access code manager 760 updates the conditional access code which is running to the conditional access code retrieved at step S470 (S480). That is, the conditional access code manager 760 updates the conditional access code which is running to a conditional access code ID having the same conditional access code ID as the conditional access code acquired through PSI parsing.

As described above, an apparatus and a method for dynamic update of a software-based IPTV conditional access system can reinforce the security of the software-based conditional access system 560 by providing a method for dynamically updating a conditional access code in the software-based IPTV conditional access system 560.

Further, the method and apparatus for dynamic update of the software-based IPTV conditional access system can update the conditional access system 560 without interrupting a viewer's receiving a channel by downloading a plurality of conditional access codes for dynamic update of the conditional access system 560.

Additionally, the apparatus and method for dynamic update of the software-based IPTV conditional access system can also minimize a danger of leaking the conditional access code which is driven by encrypting and managing a code ID of conditional access codes downloaded at the time of dynamic update of the conditional access system 560.

While the present invention has been shown and described in connection with the exemplary embodiments, it will be apparent to those skilled in the art that modifications and variations can be made without departing from the spirit and scope of the invention as defined by the appended claims.

What is claimed is:

1. A non-transitory computer readable medium for dynamic update of a software-based IPTV conditional access system in a headend connected with a receiver, comprising:

a server master key manager managing a master key and encrypting a conditional access code ID by using the master key;

a conditional access server manager generating and managing a server list by using a plurality of conditional access servers and a plurality of conditional access server IDs that are inputted, linking and storing an inputted update policy with the conditional access server IDs included in the server list, and controlling execution of the conditional access server on the basis of the stored update policy; and a conditional access code download server requesting the server master key manager to encrypt the plurality of conditional access code IDs that are inputted, generating an ID map of set of conditional access codes by combining the plurality of conditional access codes and the plurality of conditional access code IDs that are encrypted in the server master key manager, and transmitting the ID map of set of conditional access codes and the conditional access codes to the receiver on the basis of the update policy stored in the conditional access server manager.

2. The non-transitory computer readable medium for dynamic update of a software-based IPTV conditional access system according to claim 1, wherein the conditional access code download server includes:

a conditional access code registration module linking and registering the plurality of conditional access code IDs and conditional access codes, and managing conditional access codes to be downloaded to the receiver;

a conditional access code download module transmitting the plurality of conditional access code IDs and conditional access codes managed by the conditional access code registration module to the receiver; and a conditional access code management module storing the conditional access code information transmitted to the receiver by the code download module, and updating previously stored conditional access code information when the conditional access codes are transmitted to the receiver by the conditional access code download module, wherein the plurality of conditional access code IDs linked with the plurality of conditional access codes stored in the conditional access code management module are synchronized with the plurality of conditional access server IDs.

3. The non-transitory computer readable medium for dynamic update of a software-based IPTV conditional access system according to claim 1, wherein the conditional access server manager includes:

a conditional access server and update policy registration module registering a plurality of conditional access servers, and registering an update policy of the plurality of registered conditional access server;

a conditional access system ID management module managing the plurality of conditional access server IDs registered in the conditional access server and update policy registration module;

a conditional access execution information generation module providing conditional access system information which is presently executed among the plurality of conditional access servers registered in the conditional access server and update policy registration module to a program specific information (PSI) generator; and a conditional access server execution management module controlling execution of the conditional access server on the basis of the update policy registered in the conditional access server and update policy registration module.

4. The non-transitory computer readable medium for dynamic update of a software-based IPTV conditional access system according to claim 1, wherein the master key manager includes:

a master key storing module storing a master key used to encrypt the conditional access code ID; and an encryption module encrypting the conditional access code ID by using the master key stored in the master key storing module.

5. The non-transitory computer readable medium for dynamic update of a software-based IPTV conditional access system according to claim 1, further comprising a conditional access server pool storing a list and state information of the conditional access servers, and when the conditional access server is replaced in the conditional access server manger, updating the stored list and state information of the conditional access servers.

6. A non-transitory computer readable medium for dynamic update of a software-based IPTV conditional access system installed in a receiver connected with a headend, comprising:

a conditional access code object pool storing a list and state information of conditional access code objects and updating the list and state information of the conditional access code objects;

a conditional access code download client downloading an ID map of set of conditional access codes and conditional access codes from the headend, and converting them into the conditional access code objects;

a receiver master key manager storing a master key, and decrypting a conditional access code ID by using the master key; and a conditional access code manager updating the list and state information of the conditional access code objects by transmitting the conditional access code objects received from the conditional access code download client to the conditional access code object pool, and searching a valid conditional access code object from the conditional access code object pool on the basis of the conditional access code ID obtained from conditional access execution information received from the headend, and requesting the master key manager to decrypt each conditional access code ID stored in the conditional access code object pool in order to compare the conditional access code IDs while searching, and updating a conditional access code object which is running to an obtained conditional access code object corresponding to the obtained valid conditional access code ID.

7. The non-transitory computer readable medium for dynamic update of a software-based IPTV conditional access system according to claim 6, wherein the conditional access code download client includes:

a conditional access code download module downloading the ID map of set of conditional access codes and the conditional access codes from the headend; and a conditional access code loading module objectifying the conditional access codes downloaded by the conditional access code download module.

8. The non-transitory computer readable medium for dynamic update of a software-based IPTV conditional access system according to claim 6, wherein the conditional access code manager includes:

an ID map of set of conditional access codes management module storing and updating the ID map of set of conditional access codes received from the conditional access code download client;

a conditional access execution information analysis module obtaining a conditional access code ID from the conditional access execution information received from the headend, and obtaining a valid conditional access code from the conditional access code ID stored in the ID map of set of conditional access codes management module on the basis of the obtained conditional access code ID; and a conditional access code execution management module updating the conditional access code object which is running to the valid conditional access code object corresponding to the conditional access code ID obtained by the conditional access execution information analysis module.

9. The non-transitory computer readable medium for dynamic update of a software-based IPTV conditional access system according to claim 6, wherein the receiver master key manager decrypts the conditional access code ID of the conditional access code object by using the master key, and transmits the decrypted conditional access code ID to the conditional access code manager.

10. The non-transitory computer readable medium for dynamic update of a software-based IPTV conditional access system according to claim 6, wherein the receiver master key manager includes:

a master key storing module storing the master key; and a decryption module decrypting the conditional access code ID by using the master key stored in the master key storing module.

11. A method for dynamic update of a software-based IPTV conditional access system, comprising:

downloading a plurality of conditional access codes encrypted by linking a conditional access server ID from a conditional access code and server update device installed in a headend by a conditional access update device installed in a receiver; and updating a conditional access code which is running using a detected conditional access code linked with an updated conditional access server ID obtained from a program specific information (PSI) received from the headend.

12. The method for dynamic update of a software-based IPTV conditional access system according to claim 11, wherein the downloading a plurality of conditional access codes includes:

downloading an ID map of set of conditional access codes in accordance with a conditional access system update policy from the conditional access code and server update device by the conditional access update device; and downloading the plurality of conditional access codes linked with a conditional access code ID included at the downloaded ID map of set of conditional access codes from the conditional access code and server update device by the conditional access update device.

13. The method for dynamic update of a software-based IPTV conditional access system according to claim 11, wherein the updating a detected conditional access code includes:

receiving a PSI including information on the replaced conditional access server from the headend by the conditional access update device, when a conditional access server is replaced on the basis of an update policy of the conditional code system in the conditional access code and server update device;

obtaining a conditional access server ID of the replaced conditional access server by parsing the PSI generated at a PSI generator by the conditional access update device in the receiver;

searching a conditional access code object corresponding to an obtained conditional access code ID linked with the conditional access server ID among the plurality of conditional access code object downloaded by the conditional access update device; and updating the conditional access code object which is running by the conditional access update device to the conditional access code object searched at the conditional access code detecting.

14. The method for dynamic update of a software-based IPTV conditional access system according to claim 13, wherein the updating a detected conditional access code further includes:

decrypting the obtained conditional access code ID obtained by a receiver master key manager.

15. The method for dynamic update of a software-based IPTV conditional access system according to claim 11, further comprising registering a plurality of conditional access codes inputted from a system manager by a conditional access code update management device.

16. The method for dynamic update of a software-based IPTV conditional access system according to claim 15, wherein the encrypting of conditional access code IDs and registering a plurality of conditional access codes includes:

receiving the number of codes which are required to be registered from the system manager by the conditional access code and server update device;

receiving a plurality of conditional access code files and conditional access code IDs corresponding to the number of the conditional access codes which are requested to be registered, which is inputted by the conditional access code and server update device;

encrypting the conditional access code ID inputted at the plurality of conditional access code files and conditional access code IDs by the conditional access code and server update device; and storing the conditional access code ID encrypted at the conditional access code ID in linked with the conditional access code file inputted at the receiving a plurality of conditional access code files and conditional access code IDs by the conditional access code and server update device.

17. The method for dynamic update of a software-based IPTV conditional access system according to claim 11, further comprising:

registering conditional access servers linked with the conditional access codes, respectively by the conditional access code and server update device.

18. The method for dynamic update of a software-based IPTV conditional access system according to claim 17, wherein the registering conditional access servers includes:

receiving the number of conditional access servers which are requested to be registered from the system manager by the conditional access code and server update device;

registering a plurality of conditional access servers corresponding to the number of the conditional access servers which are requested to be registered, which is received at the number of conditional access servers by the conditional access code and server update device; and adding the plurality of conditional access servers which are registered at the plurality of conditional access servers to a server list by the conditional access code and server update device, wherein at the plurality of conditional access servers, conditional access server IDs of the registered conditional access servers are registered in link with the plurality of conditional access codes by the conditional access code and server update device.

19. The method for dynamic update of a software-based IPTV conditional access system according to claim 17, wherein at the registering conditional access servers, the plurality of conditional access servers linked with the plurality of conditional access codes, respectively are stored in a conditional access server pool.

20. The method for dynamic update of a software-based IPTV conditional access system according to claim 17, further comprising:
  registering an update policy for the plurality of conditional access servers registered by the conditional access code and server update device.

* * * * *